May 26, 1970   H. BLOOMFIELD ETAL   3,513,767
COLD WATER POUR-IN BEVERAGE BREWING DEVICE
Filed Sept. 11, 1968    2 Sheets-Sheet 1
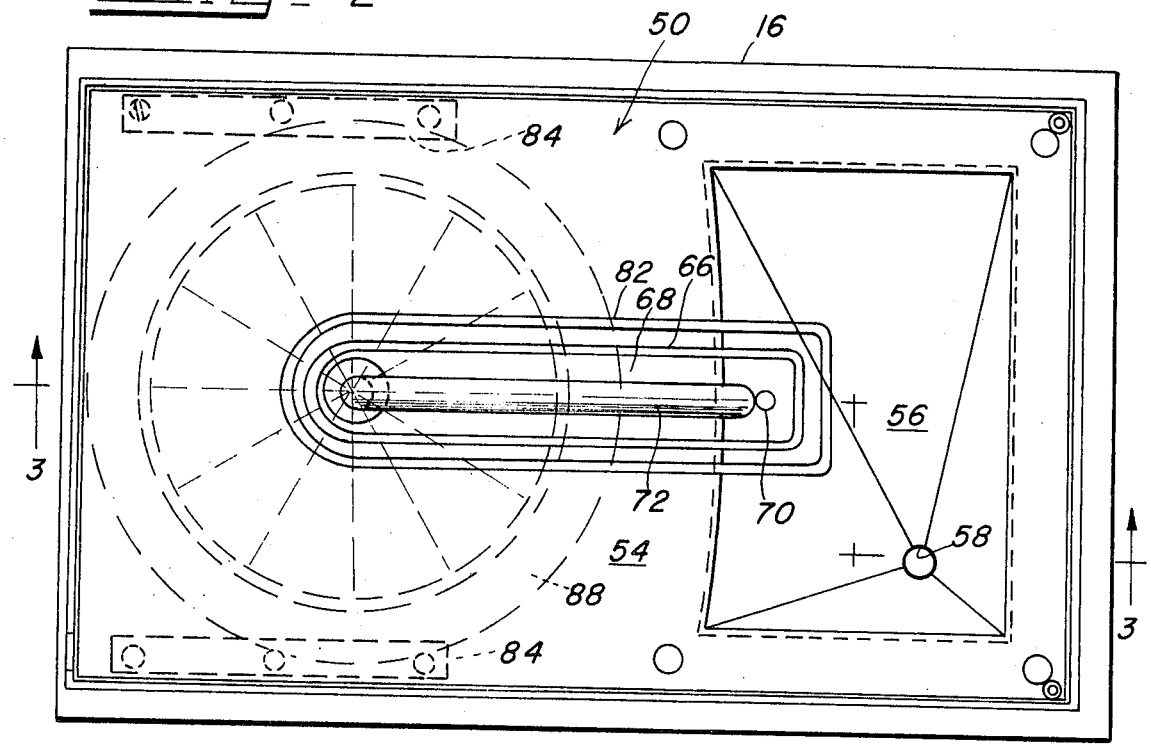
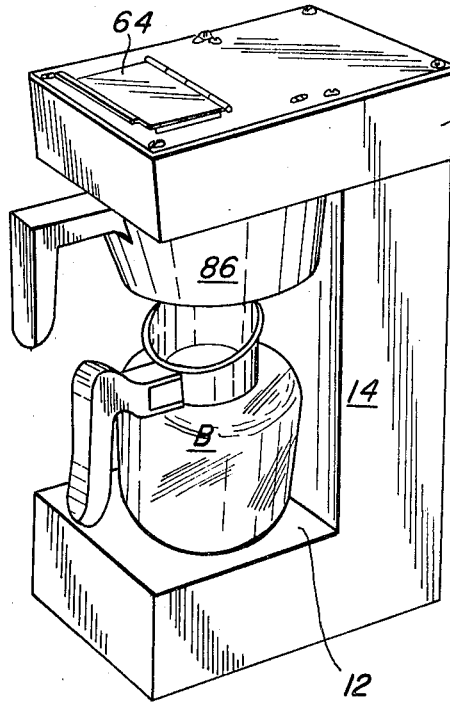
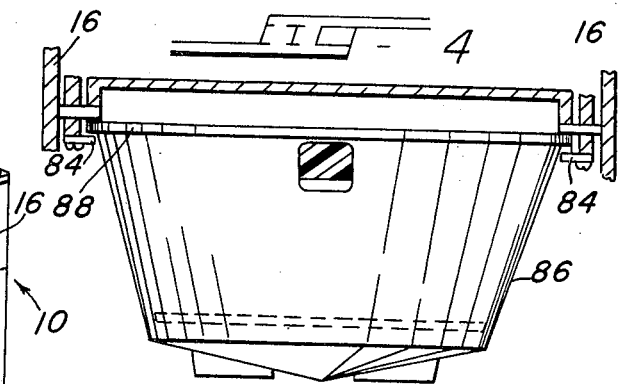
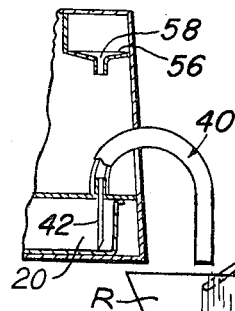
INVENTORS.
AUGUST C. PURPURA
MELVIN F. ROBERTS
HAROLD BLOOMFIELD
BY Maurice S. Cayne
ATTYS.

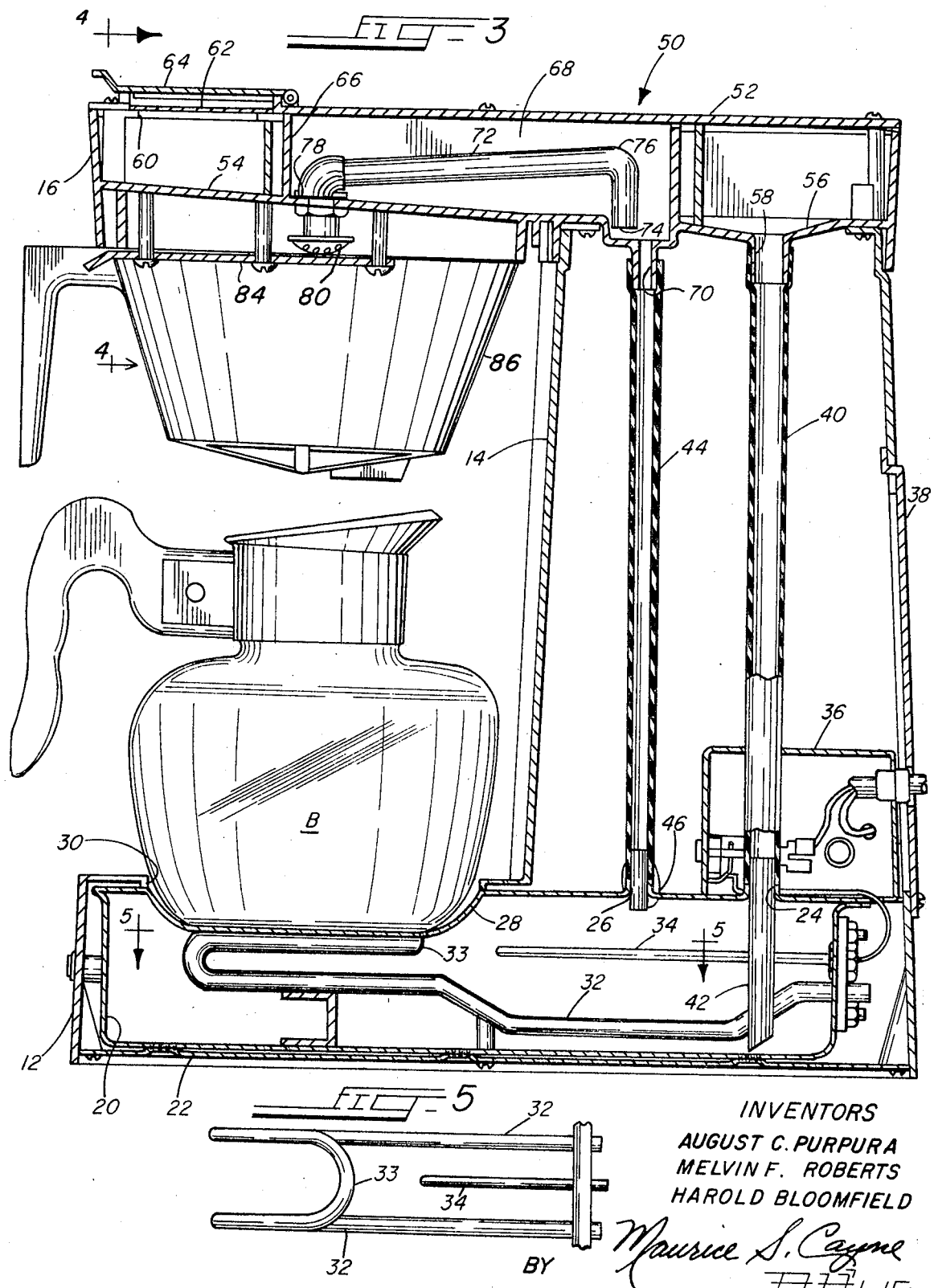

United States Patent Office 3,513,767
Patented May 26, 1970

3,513,767
COLD WATER POUR-IN BEVERAGE BREWING DEVICE
Harold Bloomfield, Chicago, August C. Purpura, Melrose Park, and Melvin F. Roberts, Niles, Ill., assignors to Bloomfield Industries, Inc., Chicago, Ill., a corporation of Delaware
Filed Sept. 11, 1968, Ser. No. 758,956
Int. Cl. A23f 1/00
U.S. Cl. 99—282                    10 Claims

ABSTRACT OF THE DISCLOSURE

A pour-in beverage brewing device of the conventional C-shaped configuration, but in which the water tank is horizontally oriented and positioned in the base to afford great stability to the device. The heating element and hot water in the tank perform the additional function of keeping warm brewed beverage in a beaker. Although the device operates with a most efficient siphon action, there is no direct physical connection between the discharge line and the water tank.

---

This invention relates to beverage brewing devices of the type wherein poured in cold water automatically displaces a like amount of hot water from a constantly heated tank and more particularly to improvements in pour in type brewing devices which render the same safer and more efficient.

Pour in devices of the type under consideration are especially desirable for use in restaurants and coffee shops for brewing beverages such as coffee and tea because fresh beverage can be made quickly and in small batches exactly equal to the amount of cold water poured in. Typically, these beverage brewing devices comprise a closed water tank which is kept substantially filled with water. Positioned in the water tank are thermostatically controlled heating means for maintaining the water at ideal brewing temperature, say from 195° to 205° F. A discharge line connects the upper portion of the water tank to a spray head which delivers the hot water to a suitably positioned supply of coffee grounds or the like. An inlet line communicates from a basin positioned above the tank to a point adjacent the tank's bottom. When cold water is poured into the basin, it gravitates and enters at the bottom of the tank, causing the displacement of hot water from the top of the tank through the discharge line and out through the spray head.

Heretofore, the prior pour in beverage makers were the same not only in the described parts and their functions, but also in the arrangement of those parts. Thus, the prior devices invariably are channel or C-shaped in side elevation. The bottom leg or base is relatively low and short and includes an electric hot plate for supporting a beaker and keeping warm the brewed beverage collected therein. The water tank is upright and occupies the vertical segment of the C-shaped device. The basin is positioned above the tank and within a canopy or hood which also encloses the tank and extends forwardly in the upper leg of the C-shaped form. The upper leg also contains the spray head and means for removably supporting the coffee grounds therebeneath.

Since the water tank is always filled with water, the greatest weight mass is contained in the vertical segment of the C. When this uneven weight distribution is coupled with the relatively short, low and lightweight base, the resulting structure is not a very stable one. Thus, the danger of inadvertently tipping the hot water-filled device is ever present. Another disadvantageous feature of the prior devices is the hot plate which requires expensive electric circuitry and controls and also is capable of inflicting painful burns if accidentally touched. Other problems sometimes were encountered when continuous use and jarring loosened the connection between the discharge line and the water tank with a corresponding loss in the efficiency of the siphon action.

It is therefore an important object of this invention to provide an improved beverage brewing device which overcomes all of the disadvantages described hereinabove.

Another object is to afford a beverage brewing device of the character described which is extremely stable and well balanced and virtually impossible to tip over. A related object is to afford such a device in which the water tank and greatest mass of weight is at the base or bottom of the device.

A further object is to provide a beverage brewing device of the character described which eliminates the need for a separate and expensive electric hot plate. A related object is to provide such a device in which the heating means in the tank and the hot water therein serve the additional function of keeping warm the brewed beverage in the beaker.

Still another object is to afford a beverage brewing device of the character described in which the discharge line and spray head are not connected directly to the water tank. Thus, efficient siphon action for delivery of hot water to the beverage making material is not dependent upon the maintenance of a perfect or airtight connection between these members.

Yet another object is to provide a beverage brewing device of the character described which is comparatively inexpensive to fabricate and yet is most efficient and durable for the purposes intended.

With the foregoing and other objects in view which will appear as the description proceeds, the preferred form of the invention comprises briefly a C-shaped structure in which the water tank is horizontally oriented and positioned in the structure's base or bottom leg. Connected to the tank and projecting upwardly therefrom are an inlet tube and an outlet tube. A horizontally oriented basin is positioned above and in parallelism with the water tank thereby providing the upper leg of the C, and the inlet and outlet tubes are connected to suitable ports in the basin bottom. The basin is formed with a chamber in which is mounted the discharge line and the siphon action of hot water through the discharge line results from the relative levels of the line's intake end and the inlet and outlet ports formed in the floor of the basin. A portion of the water tank is shaped to accommodate the bottom of a beaker and this tank portion is in substantial physical contact with the heating element in the tank for maintaining the contents of the beaker in a warm condition.

For the purpose of facilitating an understanding of our invention, we have illustrated in the accompanying drawings a preferred embodiment thereof, from an inspection of which, when considered in connection with the following description, our invention, its mode of construction, assembly and operation, and many of its advantages should be readily understood and appreciated.

Referring to the drawings in which the same characters of reference are employed to indicate corresponding or similar parts throughout the several figures:

FIG. 1 is an isometric view of an improved beverage brewing device embodying the principles of the invention;

FIG. 2 is an enlarged top plan view with the top wall of the basin removed to show details of the basin's interior construction;

FIG. 3 is a vertical sectional view taken substantially on the plane of irregular line 3—3 in FIG. 2 and viewed in the direction indicated;

FIG. 4 is a fragmentary sectional view taken on the plane of line 4—4 in FIG. 3 and viewed in the direction indicated;

FIG. 5 is a reduced size fragmentary sectional view taken on the plane of line 5—5 in FIG. 3 and viewed in the direction indicated; and FIG. 6 is a fragmentary detail view showing the manner in which the tank 20 may be drained of liquid.

Referring now with greater particularity to the various figures of the drawing, it will be seen that the numeral 10 indicates generally an improved beverage brewing device embodying the principles of the invention. As illustrated in FIGS. 1 and 3, the device 10 comprises a C-shaped body structure or housing having a base or bottom leg 12, a columnar or vertical segment 14 and a top leg 16. The three body segments are generally hollow and preferably are made of any of a number of suitable plastics having great structural strength and relatively good heat insulating qualities, such as, phenolics, acrylics, styrenes, and the like.

Positioned within the base 12 is a horizontal water tank 20 which may be made of metal and which is welded or otherwise suitable connected to a base plate 22 removably sealing the base 12. Formed in the top wall of the water tank 20 is an inlet opening 24 and an outlet opening 26. The tank top wall is likewise provided forwardly with a dish-shaped recessed area 28. The base 12 is likewise formed with an annular opening 30 in registry with the dish-shaped area 28. It will thus be seen that the dish-shaped area of the tank is adapted to accommodate a beverage beaker B positioned thereon.

An electrical heating element 32 of the Calrod type is mounted within the tank 20 for heating the water therein. Electrically associated with the heating element 32 is a thermostatic probe 34 which controls operation of the heating element to maintain the water in the tank at a predetermined brewing temperature, ideally between 195° and 205° F. It is important to note that the heating element 32 includes an arcuate return-bent segment 33 which is positioned in substantial physical contact with the flat portion of the dish-shaped area 28. The intermittently operating heating element 32 and the hot water within the tank thus cooperate with the dish-shaped area 28 to keep warm the contents of the beaker B positioned on said area.

Electrical circuitry and controls for the heating element 32 and thermostat 34 are positioned within a control box 36 mounted within the body columnar segment 14. For purposes of service, the said segment 14 is provided with a pivotally mounted access gate 38.

Rising vertically within the columnar segment 14 is an inlet tube 40 communicating with the tank inlet opening 24 and mounted over the capillary tube 42 frictionally retained in said opening and terminating at a point adjacent the bottom of the tank 20. In like manner, an outlet tube 44 communicates with the tank outlet opening 26 and is mounted over a short capillary tube 46 frictionally retained in said opening and projecting only slightly into the tank. The tubes 40 and 44 may be made of any slightly stretchable material such as various plastics and natural or synthetic rubber capable of providing the removable watertight connection illustrated in FIG. 3.

Turning specifically to FIGS. 2 and 3 of the drawings, it will be seen that the upper leg 16 comprises a water basin 50 having a top wall 52 and bottom wall 54 which slopes downwardly and terminates rearwardly in an inlet well 56. The bottom wall 54 is formed in the well 56 with an outlet port 58, and the inlet tube 40 is releasably connected to said port as illustrated. Top wall 52 is formed with an opening 60 which is covered by a removable screen 62 and selectively closed by a hinged lid 64 mounted on said top wall. It will thus be appreciated that cold water poured into basin 50 through opening 60 flows automatically through well port 58 and inlet tube 40 down into the water tank 20.

When in use the tank 20 and tubes 40 and 44 are constantly filled with water for reasons which will become apparent as the description proceeds. If it is desired to drain the device for purposes of service, cleaning, or storage, the described removable connection of tube 40 affords a simple and convenient means for readily performing this operation. As illustrated in FIG. 6, it is merely necessary to reach in through the opened gate 38 and disconnect the tube 40 from the water basin outlet part 58. The top of the tube 40 may then be lowered to begin a siphon action for draining the liquid in the tank 20 into a receptacle R.

A continuous partition wall 66 extends vertically between the basin bottom wall 54 and top wall 52 to define an elongated central chamber 68. Within the rearward portion of the chamber 68, the bottom wall 54 is formed with an outlet port 70 to which is removably connected the outlet tube 44. Supported longitudinally within the chamber 68 is a discharge line 72 having an intake end 74, a bend 76 and a discharge end 78 to which is connected a spray head such as 80. It will be observed that the discharge intake end 74 is positioned adjacent but in spaced relation with the outlet port 70 formed in the basin bottom 54. However, the said intake end 74 is substantially on the same plane with the inlet port 58 formed in the well 56. Accordingly, when the device is in a state of equilibrium, water in the two columns represented by the tubes 40 and 44 will equalize and rest at the level of the inlet port 58 and the discharge line intake end 74 (see FIG. 3).

It should likewise be noted that the discharge line bend 76 is positioned above the discharge end 78 and spray head 80. When hot water is displaced from the tank 20 it thus rises through the outlet tube 44 into the chamber 68 until it reaches the level of the highest portion of the discharge line 72, namely the bend 76. At this point there begins a siphon action which continues until all of the hot water displaced from the tank is discharged through the spray head and the water in the columns recedes to the equilibrium level of the discharge line intake end 74. The described siphon action is most efficient and is not dependent upon the maintenance of any direct physical connection between the discharge line 72 and the water tank as was previously the case. The gap between outlet tube 44 and intake end 74 is further advantageous because it prevents leakage through head 80 which might otherwise result from expansion or a sudden surge of the water in the system due to heating.

To prevent loss of temperature during the interval when the hot water is in the chamber 68 there is provided a second continuous partition wall 82 in the water basin 50 and spaced from the first partition wall 66. The double-walled chamber construction with an air space between the walls provides excellent insulation which virtually precludes loss of heat or heat transfer even when there is cold water in the basin surrounding the chamber 68.

Dependingly associated with the upper leg 16 is a pair of opposed angles or rails 84, 84. The rails 84 are adapted to releasably support a conventional brewing container 86 which typically is provided with a flange 88 (see FIG. 4). Thus, hot water discharged from the spray head 80 filters over the coffee grounds or tea leaves retained in the container 86 and the brew drips into the beaker B in the well-known manner.

It should be apparent from the above description that we have provided a novel and improved beverage brewing device which is extremely stable and virtually eliminates the possibility of dangerous inadvertent tipping of the device. No separate electric hot plate is required to warm the brewed beverage because the novel form of the water tank cooperates with the water in the tank and the proximally positioned heating element to automatically perform this warming function. A most efficient siphon action is obtained even through there is no direct physical connection between the discharge line and the water tank. In addition, economies of material may be effected because the columnar segment of the body structure is not required to enclose a large, heating radiating water tank and likewise is not required to support any substantial amounts of weight.

It is believed that our invention, its mode of construction and assembly, and many of its advantages should be readily understood from the foregoing without further description and it should also be manifest that while a preferred embodiment of the invention has been shown and described for illustrative purposes, the structural details are nevertheless capable of wide variation within the purview of our invention as defined by the appended claims.

What we claim and desire to secure by Letters Patent of the United States is:

1. A beverage brewing device comprising:
   a housing having a base leg, a vertical segment and a top leg;
   a water tank positioned in said base leg;
   means for electrically heating water in said tank;
   a cold water receiving basin above said water tank;
   an inlet water line and an outlet water line connected between said basin and said water tank; and
   a discharge line for discharging hot water displaced from said water tank onto a beverage brewing substance.

2. The brewing device of claim 1 in which said water tank is horizontally oriented and comprises an exposed recessed dish-shaped area formed in the top wall thereof, said dish-shaped area adapted to accommodate a beaker for collecting and retaining the brewed beverage.

3. The brewing device of claim 2 in which said heating means includes a segment positioned in substantial physical contact with said dish-shaped area; and
   thermostat means electrically associated with said heating means for maintaining water in said tank at a pre-selected temperature.
   said heating means and heated water in said tank cooperating with said dish-shaped area for warming the contents of a beaker positioned thereon.

4. The brewing device of claim 1 in which said cold water basin is positioned in said top leg,
   said discharge line being mounted in said basin.

5. The brewing device of claim 4 in which said basin comprises:
   a top wall having an opening for pouring cold water thereinto; and a bottom wall having a downwardly sloping segment terminating in a well;
   said well having an inlet port formed therein and connected to said inlet water line;
   said bottom wall having an outlet port formed therein and connected to said outlet water line.

6. The brewing device of claim 5 in which a partition wall is positioned in said basin to provide a chamber, said discharge line being mounted in said chamber and said outlet port communicating with said chamber.

7. The brewing device of claim 6 in which a second partition wall is positioned in said basin spaced from and surrounding said first partition wall, said two partition walls and air space therebetween cooperating to prevent loss of heat from the displaced hot water when the same is in said chamber.

8. The brewing device of claim 7 in which said discharge line comprises further an intake bend and a discharge end,
   said bend being positioned above said discharge end whereby displaced hot water entering said chamber through said outlet port and rising to the level of said bend creates a siphon action through said discharge line which continues until all of the displaced water is discharged from said discharge end and the water in the device once again recedes to the said equilibrium plane.

9. The brewing device of claim 7 in which said inlet and outlet water lines comprise slightly elastic tubes extending vertically through said vertical segment and being removably connected respectively to said inlet port and outlet port and to said water tank.

10. The brewing device of claim 6 in which said discharge line includes an intake end spaced from said outlet port,
    said intake end being on substantially the same horizontal plane with said inlet port whereby water normally within the device and in said inlet and outlet water lines achieves an equilibrium state at said plane.

References Cited

UNITED STATES PATENTS

| | | | |
|---|---|---|---|
| 3,220,334 | 11/1965 | Martin | 99—282 |
| 3,332,337 | 7/1967 | Lowry | 99—282 |
| 3,385,201 | 5/1968 | Martin | 99—282 |
| 3,425,337 | 2/1969 | Vittoe | 99—281 |

ROBERT W. JENKINS, Primary Examiner

U.S. Cl. X.R.

99—307